(12) United States Patent
Bank et al.

(10) Patent No.: US 9,361,653 B2
(45) Date of Patent: Jun. 7, 2016

(54) SOCIAL RECOMMENDATIONS FOR BUSINESS PROCESS PLATFORM

(71) Applicants: Guy Bank, Tel Aviv (IL); Maxim Drabkin, Haifa (IL); Uri Nizan, Herzliya (IL)

(72) Inventors: Guy Bank, Tel Aviv (IL); Maxim Drabkin, Haifa (IL); Uri Nizan, Herzliya (IL)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 13/742,504

(22) Filed: Jan. 16, 2013

(65) Prior Publication Data
US 2014/0201096 A1    Jul. 17, 2014

(51) Int. Cl.
- G06F 17/30 (2006.01)
- G06Q 50/00 (2012.01)
- G06Q 10/06 (2012.01)
- G06Q 30/02 (2012.01)

(52) U.S. Cl.
CPC .......... *G06Q 50/01* (2013.01); *G06F 17/30864* (2013.01); *G06Q 10/067* (2013.01); *G06Q 30/02* (2013.01)

(58) Field of Classification Search
CPC ................................ G06F 17/30129
USPC ....................................... 707/702
See application file for complete search history.

(56) References Cited

U.S. PATENT DOCUMENTS

| | | | |
|---|---|---|---|
| 7,702,545 B1 * | 4/2010 | Compton et al. ............ | 705/26.9 |
| 8,244,566 B1 * | 8/2012 | Coley ................... | G06Q 10/109 705/7.11 |
| 8,601,027 B2 * | 12/2013 | Behforooz et al. ........... | 707/790 |
| 8,655,989 B2 | 2/2014 | Ritter et al. | |
| 8,832,556 B2 * | 9/2014 | Steinberg .......... | G06F 17/30389 707/769 |
| 2005/0216550 A1 | 9/2005 | Paseman et al. | |
| 2009/0070426 A1 | 3/2009 | McCauley et al. | |
| 2009/0281988 A1 * | 11/2009 | Yoo ................................... | 707/3 |
| 2009/0327427 A1 | 12/2009 | Mathew et al. | |
| 2010/0125490 A1 * | 5/2010 | Kiciman ............ | G06Q 30/0207 705/14.1 |
| 2011/0185020 A1 | 7/2011 | Ramamurthy et al. | |
| 2011/0191364 A1 * | 8/2011 | LeBeau et al. ................ | 707/767 |
| 2011/0196895 A1 * | 8/2011 | Yi .................. | 707/776 |
| 2012/0078802 A1 | 3/2012 | Kieselbach | |
| 2012/0136852 A1 * | 5/2012 | Geller ............... | G06F 17/30528 707/722 |
| 2012/0143952 A1 | 6/2012 | Graf | |
| 2013/0018777 A1 | 1/2013 | Klein | |
| 2013/0086483 A1 * | 4/2013 | Vainer .................... | G06F 9/4445 715/751 |
| 2013/0086495 A1 * | 4/2013 | Guzansky .............. | G06Q 20/00 715/762 |
| 2013/0091132 A1 * | 4/2013 | Khalatov ....... | G06Q 10/063118 707/732 |
| 2013/0091456 A1 * | 4/2013 | Sherman ................ | G06Q 10/10 715/778 |
| 2013/0139081 A1 * | 5/2013 | Alon ...................... | G06Q 10/10 715/765 |
| 2013/0144945 A1 | 6/2013 | Said et al. | |

(Continued)

*Primary Examiner* — Noosha Arjomandi
(74) *Attorney, Agent, or Firm* — Fish & Richardson P.C.

(57) ABSTRACT

Methods, systems, apparatus, and computer programs encoded on computer storage medium, for integrating business data and social data in execution of a business process, implementations including actions of receiving user input, the user input being associated with a task of the business process and being received during interaction with an application, determining that a social query is triggered, querying business data based on a business query, the business query being generated based on the user input, querying social networking data based on the social query, the social query being generated at least partially based on the user input, receiving business data in response to the business query, receiving social data in response to the social query, and providing at least a portion of the business data and at least a portion of the social data for display to a user that provided the user input.

13 Claims, 9 Drawing Sheets

(56) References Cited

U.S. PATENT DOCUMENTS

| | | | |
|---|---|---|---|
| 2013/0144957 A1* | 6/2013 | Sherman et al. | 709/206 |
| 2013/0159926 A1* | 6/2013 | Vainer | G06F 17/30 715/804 |
| 2013/0282603 A1 | 10/2013 | Gaedcke et al. | |
| 2013/0282706 A1* | 10/2013 | Yoo | 707/723 |
| 2013/0282746 A1 | 10/2013 | Balko et al. | |
| 2013/0287204 A1* | 10/2013 | Davis | H04L 9/28 382/28 |
| 2014/0006389 A1* | 1/2014 | Garcia et al. | 707/723 |
| 2014/0025733 A1 | 1/2014 | Khan et al. | |
| 2014/0047351 A1 | 2/2014 | Cui et al. | |
| 2014/0129292 A1* | 5/2014 | Ruvini | 705/7.34 |
| 2014/0130135 A1* | 5/2014 | Mao et al. | 726/4 |
| 2014/0180867 A1* | 6/2014 | Zises | 705/26.7 |
| 2014/0181146 A1* | 6/2014 | Jamthe et al. | 707/777 |

\* cited by examiner

402 →

Airline

Airline Website

USA | All Regions    Help & Support

Jack

Destination [Paris ▽]

404 →

Departing [02/01/2013] 🗓    Returning [02/13/2013] 🗓

| Flight Number △ | Date and Time | Price | Route |
|---|---|---|---|
| TD 713 | 02/01/2013 05:30 | $299 | AUS -> JFK ← 412 |
| TD 714 | 02/13/2013 10:15 | $279 | JFK -> TLV |

406 →

2 Social Connected Friends flew with us to Paris on these Flights    } 410

David    Frank

FIG. 4C

SOCIAL RECOMMENDATIONS FOR BUSINESS PROCESS PLATFORM

BACKGROUND

Business data and social data are often provided to customers and businesses separately. For example, when a user is interacting with a website to purchase a product, business data can be provided to the user such as the pricing and availability of the product. However, the business data provided alone can be lacking a social context, which is becoming more valuable to consumers and businesses alike.

SUMMARY

Implementations of the present disclosure include computer-implemented methods for integrating business data and social data in execution of a business process. Implementations include actions of receiving user input, the user input being associated with a task of the business process and being received during interaction with an application, determining that a social query is triggered, querying business data based on a business query, the business query being generated based on the user input, querying social networking data based on the social query, the social query being generated at least partially based on the user input, receiving business data in response to the business query, receiving social data in response to the social query, and providing at least a portion of the business data and at least a portion of the social data for display to a user that provided the user input.

In some implementations, determining that a social query is triggered includes determining that a user interface component, through which the user input is received, is associated with the social query.

In some implementations, determining that a user interface component, through which the user input is received, is associated with the social query includes referencing an association table, the association table associating social queries to user interface components.

In some implementations, actions further include, in response to determining that a social query is triggered: receiving a social query model, the social query model defining one or more terms of the social query, and populating at least one term of the one or more terms with a value provided from the user input.

In some implementations, actions further include populating at least one term of the one or more terms with a value provided from the business data.

In some implementations, the social query model is received from a social query repository.

In some implementations, actions further include receiving a business query model, the business query model defining one or more terms of the business query, and populating at least one term of the one or more terms with a value provided from the user input.

In some implementations, actions further include providing one or more graphical user interfaces (GUIs) for display to the user, each GUI of the one or more GUIs being associated with a task of the business process and comprising at least one user interface component, through which the user input is received.

In some implementations, the business query is generated based on a business query model that is defined during a design-time, the business query model defining one or more terms of the business query that can be populated with values based on the user input.

In some implementations, the social query is generated based on a social query model that is defined during a design-time, the social query model defining one or more terms of the social query that can be populated with values based on the user input.

In some implementations, the business data is provided from a business data source associated with a back-end system of an enterprise, the enterprise providing the business process.

In some implementations, the social networking data is provided from one or more social networking services, each social networking service being independent of an enterprise that provides the business process.

In some implementations, querying social networking data based on the social query includes transmitting the social query to each of the one or more social networking services through respective application programming interfaces (APIs).

In some implementations, the application includes a web-based application.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIGS. 4A-4C depict an example graphical user interface associated with the example business process of FIG. 3.

Like reference numbers represent corresponding parts throughout.

DETAILED DESCRIPTION

Implementations of the present disclosure are generally directed to integrating business data and social data. In some implementations, a process is performed based on user input. In some examples, the process can be a business process that is performed based on user input received through a graphical user interface (GUI). For example, a user can interact with a website, and can provide user input to the website. In response to the user input, business data can be retrieved and can be presented to the user. For example, the user can be researching flight information using the website for an upcoming travel arrangement. The business data can include a listing of available flights for a particular destination and departure/return dates. In accordance with implementations of the present disclosure, and also in response to the user input, social data can be retrieved and can be presented to the user. For example, the user can participate in one or more social networking services. The social data can be retrieved from the one or more social networking services and can correspond to the business data. For example, the social data can correspond to the listing of available flights obtained (e.g., the business data), and can include a listing of contacts that are socially connected to the user and that have also flown on one or more of the flights.

Figure 1:
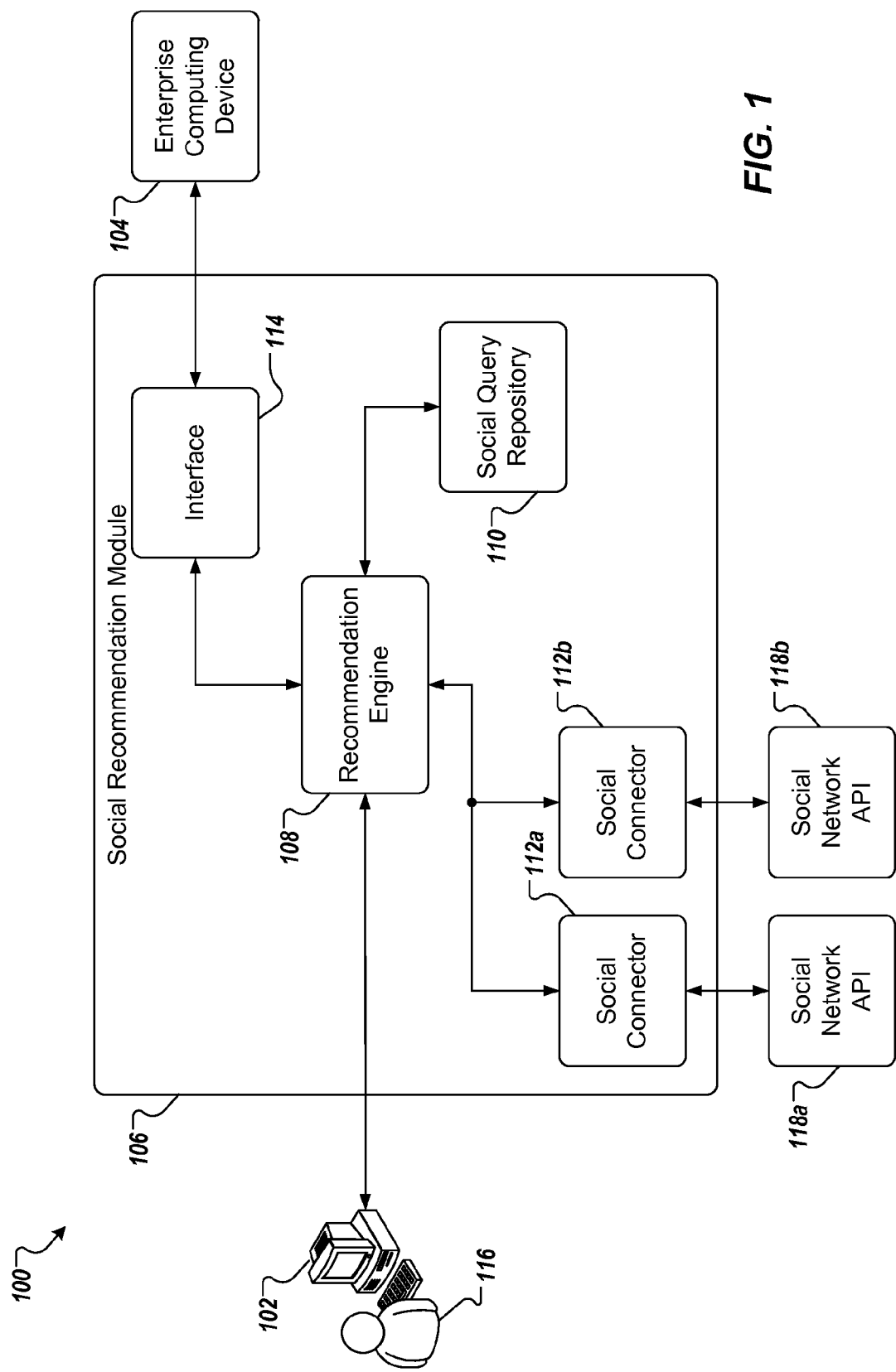
FIG. 1 depicts an example system for integrating social data and business data in accordance with implementations of the present disclosure.

FIG. 1 depicts an example system 100 for integrating social data and business data. In the depicted example, the system 100 includes a client computing device 102, an enterprise back-end 104, and a social recommendation module 106. The social recommendation module 106 includes a recommendation engine 108, a social query repository 110, one or more social connectors 112 (depicted as social connectors 112a and 112b), and an interface 114. In some examples, the social recommendation module 108 can be provided as one or more computer-executable programs that are executed by one or more computing devices (e.g., servers). In some examples, the enterprise back-end 104 can be provided as one or more computer-executable programs that are executed using one or more computing devices (e.g., servers). In some examples, the enterprise back-end 104 hosts an application (e.g., a business application) that can be provided as a web-based application. The client computing device 102, the enterprise back-end 104, and the social recommendation module 106 can be connected for communication by any appropriate form or medium of digital data communication such as a communication network (e.g., a LAN, a WAN).

In some implementations, a user 116 of the client computing device 102 can interact with an application. In some examples, the application is a web-based application (e.g., hosted at the enterprise back-end 104) that is based on an underlying process (e.g., a business process), as discussed in further detail herein. In some examples, the client computing device 102 can display one or more GUIs, through which the user can provide input to the application and can receive output from the application. In accordance with implementations of the present disclosure, the computing device 102 receives user input from the user 116 and provides the user input to the recommendation engine 108. The user input can include any appropriate transaction between the client computing device 102 and the enterprise backend 104. For example, the transaction can include user interaction with the GUI presented on the client computing device 102. In some examples, the user input can include a user query.

The recommendation engine 108 receives the user input from the client computing device 102. In response, and in accordance with implementations of the present disclosure, the recommendation engine 108 analyzes the user input and generates a business query to query the enterprise back-end 104 through the interface 114 for business-related data. For example, the business query can include a request for business data associated with a particular business process, as discussed in further detail herein. Further, the recommendation engine 108 determines whether a social query is associated with the user input. For example, the recommendation engine 108 determines whether a social query is to be triggered based on the user input. In some examples, the association between the social query and the user input can be predefined. In some examples, the association between the social query and the user input can be defined at design-time of the application (e.g., by a developer). In some examples, the association between the social query and the user input can be stored in a table in a database (e.g., an association table), such as the social query repository 110.

If the recommendation engine 108 determines that a social query is associated with the user input, the recommendation engine 108 retrieves the social query from the social query repository 110. In some examples, the recommendation engine 108 determines that the social query is associated with the user input via the association table. In some examples, the social query is provided as a model that is processed by the recommendation engine 108. For example, the recommendation engine 108 populates fields (e.g., search terms) of the social query with at least a portion of the user input. In some examples, more than one social queries can be associated with the user input.

In some examples, the recommendation engine 108 further determines whether a social query is associated with the business query (in addition to, or in lieu of, determining whether a social query is associated with the user input). In some examples, the recommendation engine 108 populates the social query with at least a portion of business data that is retrieved based on the business query. In some examples, the recommendation engine 108 queries a business data source (e.g., the enterprise back-end 104) using the business query and a social data source (e.g., one or more social networking services) using the social query in parallel.

In some examples, the recommendation engine 108 provides the social query to one or more social networking services using respective social connectors 112a, 112b. In some examples, the social connectors 112a, 112b provide the social query to respective application programming interfaces (APIs) associated with the one or more social networking services. Although two social network APIs 118a, 118b and respective social connectors 112a, 112b are depicted in the example of FIG. 1, it is appreciated that any number of social network APIs and social connectors can be implemented (e.g., the social query can be provided to any number of social networking services).

In some implementations, the enterprise back-end processes the business query to provide business data back to the recommendation engine 108 through the interface 114. In some implementations, each social networking service processes the social query to provide social data back to the recommendation engine 108 through the respective social network API 118a, 118b and social connector 112a, 112b.

In some implementations, the social query repository 110 stores the social queries. In some examples, the social query repository 110 stores the social queries as XML models. In some examples, the XML models can define the business model, the business action, the social model, the social query, and the processing instructions.

In some implementations, the social connectors 112a, 112b receive the social query from the recommendation engine 108 and retrieve social data from the one or more social networking services through the social network APIs 118a, 118b based on the social query. The social connectors 112a, 112b provide the social data to the recommendation engine 108 for processing. In some examples, the social connectors 112a, 112b receive a populated social query, and provide social data received from the one or more social networking services based on the populated social query.

In some examples, the interface 114 receives the business query from the recommendation engine 108, and provides the business query to the enterprise back-end 104. In some examples, the interface 114 formats (e.g., translates) the business query to an appropriate protocol for communication with the enterprise back-end 104. In some examples, the interface 114 communicates with the enterprise back-end 104 using a protocol (e.g., representational state transfer (REST), simple object access protocol (SOAP)).

In some examples, the enterprise back-end 104 receives the business query from the interface 114 and identifies business data from business-related processes (or other business databases) in view of the business query. The business data is based on the business query. The enterprise back-end 104 provides the business data to the recommendation engine 108 for processing.

Figure 2A:
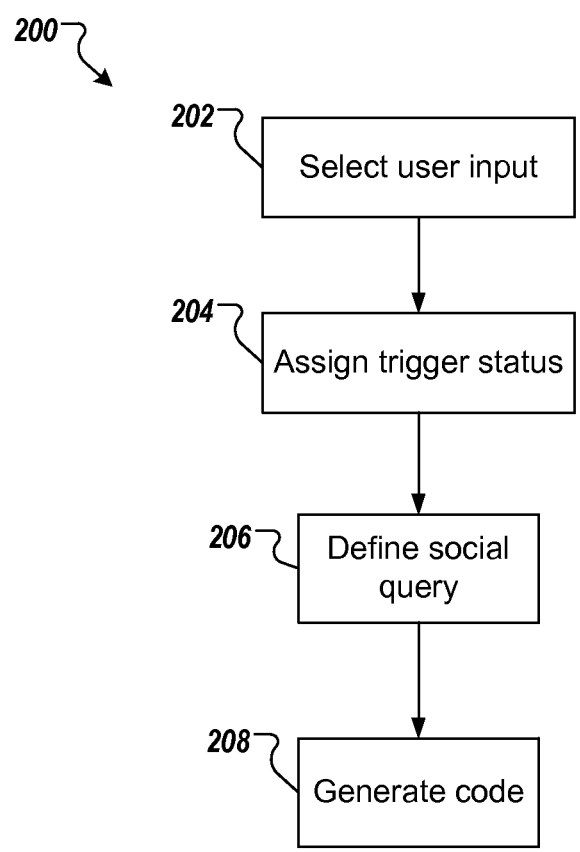
FIG. 2A depicts an example process for composing a social query.

FIG. 2A depicts an example process 200 for defining one or more social queries and defining a trigger for each social query. The example process 200 can be executed using one or more computer-executable programs executed using one or more computing devices. In some examples, a graphical editor tool can be used to execute the example process 200 (see FIG. 5). In some examples, the example process 200 is performed by a developer during design-time of an application that is to receive user input from and provide output to a GUI displayed to the user.

A user interface component is selected (202). In some examples, the user interface component includes one of a plurality of user interface components that can be provided in a GUI displayed to a user. For example, a GUI can include one or more user interface components, through which a user can provide user input. A trigger status of the selected user interface component is assigned (204). In some examples, the trigger status indicates whether a social query is to be triggered in response to user input received through the selected user interface component. For example, when the trigger status is provided as "on" or "set" (or other positive association), user input received through the selected user interface component triggers a social query. When the trigger status is provided as "off" or "not set" (or other non-association and/or negative association), user input received through the selected user interface component does not trigger a social query.

If a positive trigger status is associated with the selected user interface component, the social query that is to be triggered is defined (206). In some examples, the social query can be defined to include one or more terms. In some examples, at least one term of the one or more terms can be assigned a value based on user input that is input to the selected user interface component during run-time of the application, as discussed in further detail below. In some examples, at least one term of the one or more terms can be assigned a value based on business data that is retrieved in response to the user input during run-time of the application, as discussed in further detail below. Computer-language programming code for the social query is generated (208). In some examples, the code is executed to perform social data retrieval in response to user input to the selected user interface component during run-time of the application.

Figure 2B:
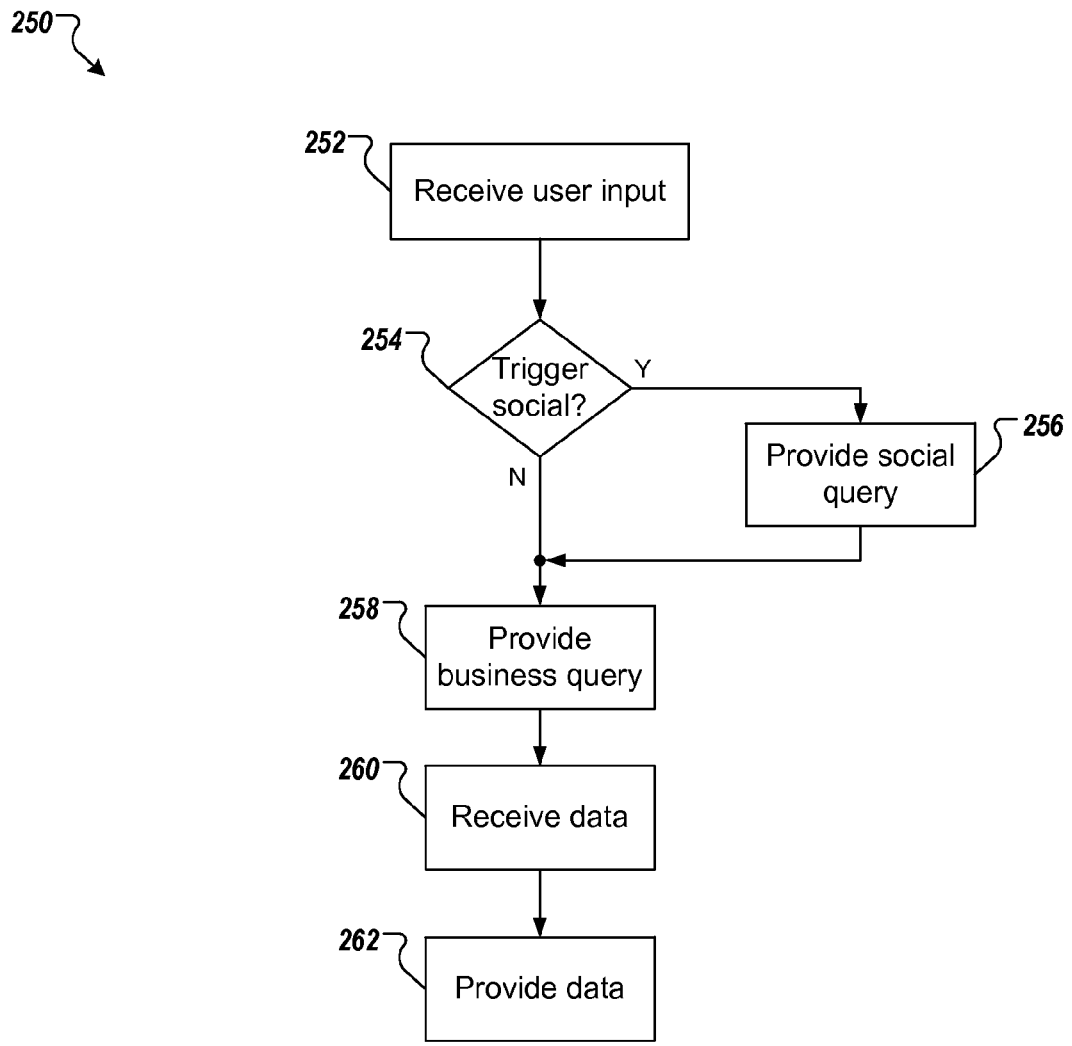
FIG. 2B depicts an example process for integrating social data and business data.

FIG. 2B depicts an example process 250 for integrating social data and business data. The example process 250 can be executed using one or more computer-executable programs executed using one or more computing devices. For example, the system 100 can execute the example process 250.

User input is received (252). For example, the recommendation engine 108 receives the user input from the client computing device 102. In some examples, the user input can be provided through any appropriate transaction between the client computing device 102 and the enterprise back-end 104 (e.g., as the user 116 interacts with a web-application hosted by the enterprise back-end 104).

It is determined whether a social query is to be triggered (254). For example, the recommendation engine 108 determines whether the user input (e.g., received at 252) is received through a user interface component associated with a social query (e.g., based on an association table). As an example, and as discussed above, a user interface component can have a trigger status of "on" or "set" (or other positive association), and a social query that is to be issued in response to the user input being received through the user interface component can be defined. If it is determined that a social query is to be triggered, a social query is provided (256). For example, the recommendation engine 108 retrieves the social query from the social query database 110 and populates the social query. In some examples, the recommendation engine 108 populates terms of the social query with values provided from the user input received. In some examples, the recommendation engine 108 provides the social query to the appropriate social connectors 112.

The business query is provided (258). For example, the recommendation engine 108 provides the business query to the enterprise back-end 104. Specifically, the recommendation engine 108 analyzes the user input, and based on the user input, generates a business query to provide to the enterprise computing system 104 to retrieve business-related data. In some examples, the recommendation engine 108 populates terms of the business query with values provided from the user input received.

The business data and/or the social data is received (260). For example, the recommendation engine 108 receives the business data (based on the business query) from the enterprise back-end 104. In some examples, and is a social query was triggered, the recommendation engine 108 further receives social data (based on the social query) from the social connectors 112. The business data and/or the social data is provided (262). For example, the recommendation engine 108 processes the received social data (e.g., from the social connectors 112) and the received business data (e.g., from the enterprise computing device 104). The recommendation engine 108 can provide the processed data (e.g., the processed business data and/or processed social data) to the client computing device 102 for display to the user 116. In some implementations, processing of the business data and the social data by the recommendation engine 108 can include filtering, sorting, and/or joining the business data and the social data.

In some implementations, the social query can be provided after the business data is received in response to the business query. In some examples, one or more terms of the social query can be populated based on the business data.

Implementations of the present disclosure are discussed in further detail below with reference to an example context. The example context is provided as an example business process including a user booking a flight with an airline. More particularly, a web-based application is provided and includes GUIs for receiving user input that is to be processed in the business process to provide business data and user data to the user. It is appreciated, however, that implementations of the present disclosure are readily applicable in other contexts.

Figure 3:
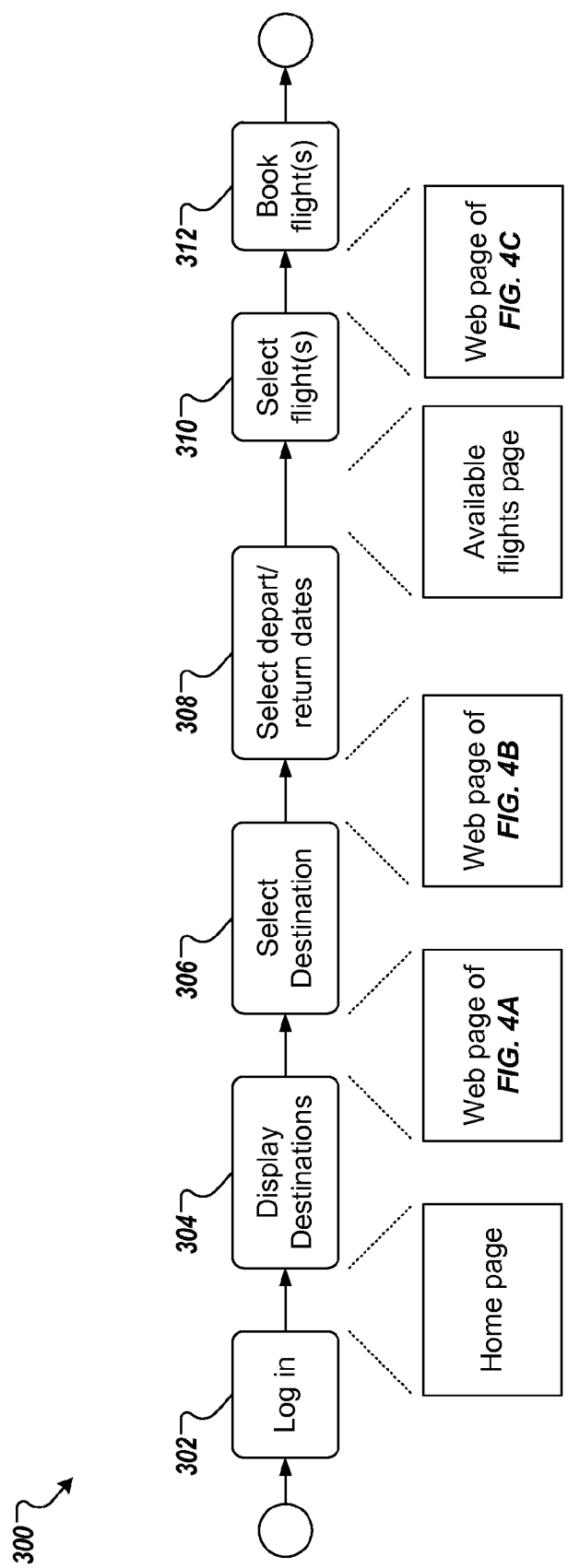
FIG. 3 depicts an example business process.

FIG. 3 depicts an example business process 300. The business process 300 includes a plurality of tasks. In accordance with the example context, the example business process 300 includes booking of a flight using an airline website. In other example contexts, other example business process can be provided (e.g., for purchasing items (e-commerce), renting cars).

A task 302 can include the user logging in (e.g., providing credentials) to a log-in enabled website. For example, logging in by the user (e.g., the user 116) can include providing a username and password using a log-in page (e.g., GUI) of the website. When providing the log-in information to the website, the user may be presented with a "home page" (not shown).

A task 304 can include displaying destinations available to the user. For example, the user provides user input using the website to display destinations that are associated with the airline (e.g., selecting a link to display destinations). In response to such user input, the recommendation engine 108 generates a business query based on the user input and provides the business query to the enterprise back-end 104 using the interface 114. The enterprise back-end 104 provides business data to the recommendation engine 108 using the interface 114. For example, the business query can include a query of available destinations (provided by the airline) and the business data can include the listing of destinations (provided by the airline). The recommendation engine 108 provides the listing of destinations to the client computing device 102 such that the listing of destinations is displayed on a GUI.

Figure 4A:
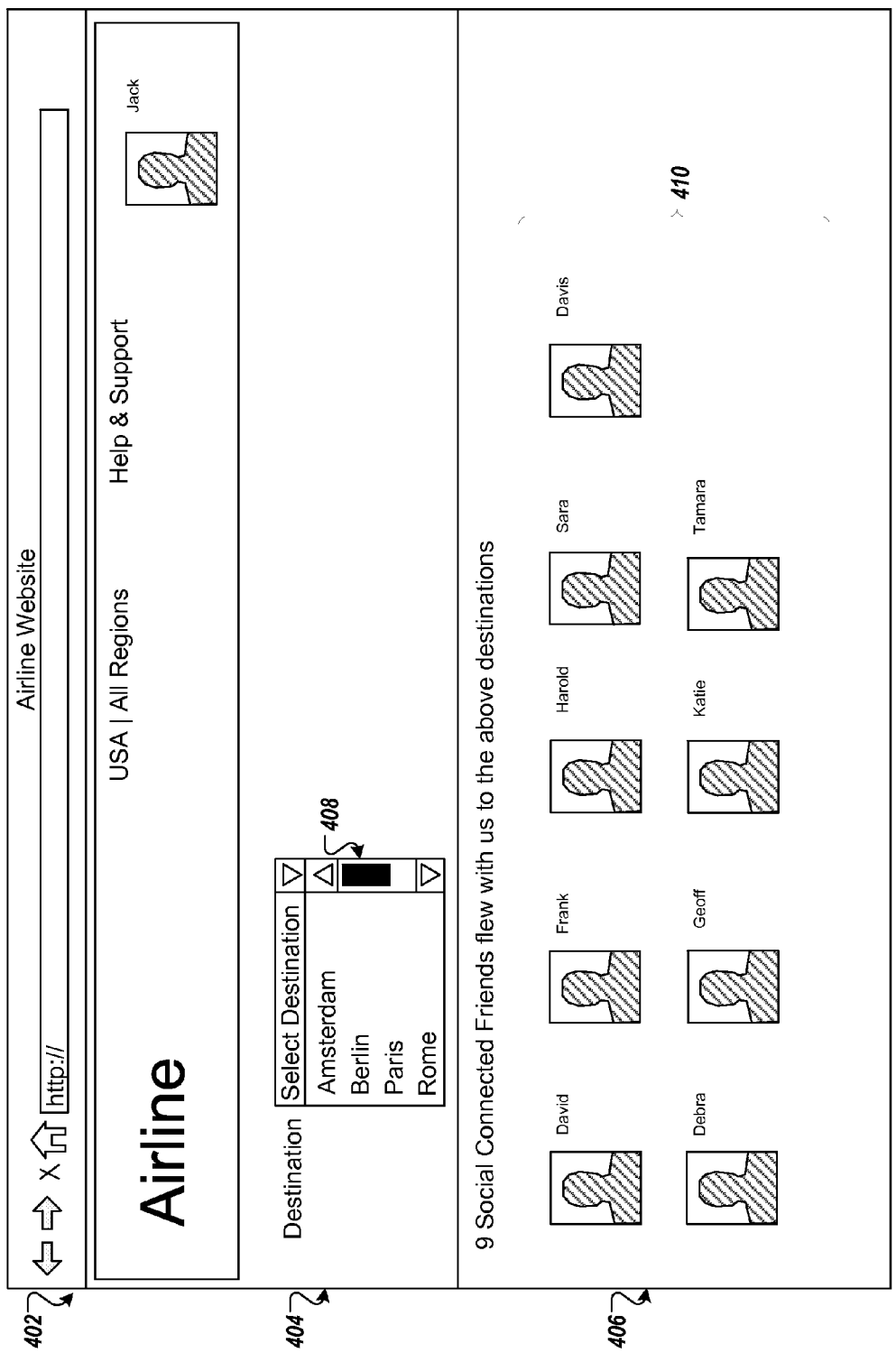

FIG. 4A depicts an example GUI 402 that can be displayed on the client computing device 102. In the depicted example, the GUI 402 includes a business data portion 404. The business data portion 404 provides graphical representations of the business data received from the enterprise back-end 104 by the recommendation engine 108. For example, in response to the user input associated with a display of destinations that are associated with the airline (e.g., task 304), the business data portion 404 includes a listing 408 of such destinations (e.g., Amsterdam, Berlin, Paris, Rome, etc.).

In the depicted example, the recommendation engine 108 determines that the user input (e.g., to display destinations that are associated with the airline) is associated with a social query. For example, the associated social query can include a query of socially-connected friends to the user that have flown with the airline. The recommendation engine 108 receives the associated social query from the social query repository 110 and provides the social query to the social connectors 112a, 112b. The social connectors 112a, 112b query one or more social networking services to retrieve social data (e.g., using the social network APIs 118a, 118b). For example, the social data can include a listing of contacts that are socially connected to the user and that have flown with the airline.

With continued reference to FIG. 4A, the GUI 402 further includes a social data portion 406. The social data portion 406 provides graphical representations of the social data received from the one or more social networking services. For example, in response to the user input associated with a display of destinations that are associated with the airline (e.g., task 304), the social data portion 406 includes a display of contacts 410 that are socially connected to the user and that have flown with the airline (e.g., to the destinations of the listing 408). In this manner, the business data (e.g., the listing of destinations) is joined with the social data (e.g., the listing of socially-connected contacts).

Referring again to FIG. 3, a task 306 can include selection of a destination from the provided listing of destinations (obtained in task 304). For example, the user provides user input using the website to select a destination (e.g., Paris). In response to such user input, the recommendation engine 108 determines that the user input (e.g., the selection of the destination) is associated with a social query. For example, the associated social query can include a query of contacts that are socially connected to the user and that have flown to the selected destination (e.g., Paris).

The recommendation engine 108 receives the associated social query from the social query repository 110 and queries the one or more social networking services using the social connectors 112a, 112b. The social connectors 112a, 112b receive social data from the social networking services (e.g., through the social networking APIs 118a, 118b). For example, the social data can include contacts that are socially connected to the user and that have flown to the selected destination.

Figure 4B:
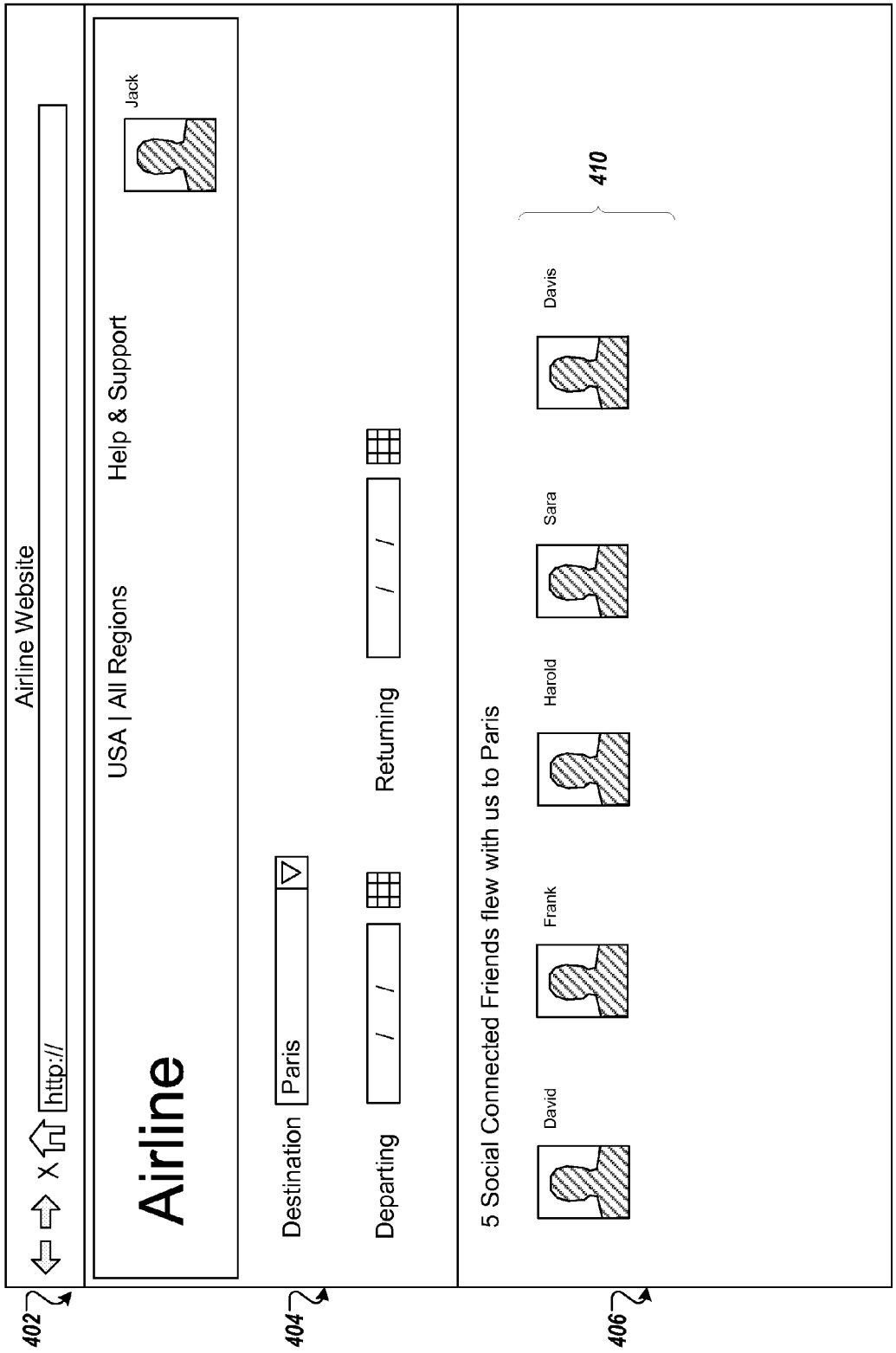

For example, FIG. 4B illustrates an updated version of the GUI 402 displayed on the client computing device 102. In the depicted example, the business data portion 404 includes an updated representation of the business data in response to the user selection of the destination (e.g., Paris) and further includes fields for input relating to departing data and returning date. Additionally, the social data portion 406 includes representations of the contacts 410 that are socially connected to the user and that have flown to the selected destination (e.g. Paris).

Referring again to FIG. 3, a task 308 can include selection of depart/return dates available for the selected destination (obtained in task 306). For example, the user provides user input using the website to select depart/return dates. In response to such user input, the recommendation engine 108 generates a business query based on the user input (e.g., the selection of depart/return dates) and provides the business query to the enterprise back-end 104. The enterprise back-end 104 provides business data to the recommendation engine 108 in response to the business query. For example, the business query can include a query of available flights for the selected destination (e.g., Paris) and for the selected depart/return dates. In some examples, the business data can include a listing of available flights (e.g., flight numbers). The recommendation engine 108 provides the listing of available flights to the client computing device 102 such that the destinations are displayed on the GUI. For example, the GUI can include an "available flights page" (not shown).

In this example, the recommendation engine 108 determines that the user input (e.g., selection of depart/return dates) is associated with a social query. For example, the associated social query can include a query of contacts that are socially connected to the user and that have flown to the selected destination (e.g., Paris) on one or more of the available flights (e.g., the flight numbers). In some examples, the associated social query is populated with the received business data (e.g., the flight numbers).

The recommendation engine 108 retrieves the social query from the social query repository 110 and queries the one or more social networking services based on the social query. The social connectors 112a, 112b receive social data from the social networking services (e.g., through the social network APIs 118a, 118b). For example, the social data can include the contacts that are socially connected to the user and that have flown to the selected destination (e.g., Paris) on one or more of the available flights (e.g., the flight numbers). Thus, the social data (e.g., the listing of contacts that are socially connected to the user that have flown on one or more of the available flights) is filtered by the business data (e.g., the listing of available flights).

Referring again to FIG. 3, a task 310 can include selection of specific flight(s) available from the listing of available flights (obtained in task 308). For example, the user provides user input using the website to select specific flight(s) (e.g., a departing flight and a returning flight). In response to such user input, the recommendation engine 108 determines that the user input (e.g., selection of the one or more flights) is associated with a social query. For example, the associated social query can include a query of contacts that are socially connected to the user and that have flown on the selected flight(s)). In some examples, the associated social query is populated with the business data (e.g., the flight numbers of the selected flight(s)).

The recommendation engine 108 receives the social query from the social query repository 110 and queries the one or more social networking services. The social connectors 112a, 112b receive social data from the social networking services. For example, the social data can include the contacts that are socially connected to the user and that have flown on the selected flight(s).

For example, FIG. 4C illustrates an updated version of the GUI 402 displayed on the client computing device 102. In this example, the business data portion 404 includes a representation of the business data received from the enterprise back-end 104 by the recommendation engine 108. For example, in response to the user input associated with a selection of specific flight(s) (e.g., task 310), the business data portion 404 includes a listing 412 of available flights (e.g., flight numbers). Additionally, the social data portion 406 includes representations of the contacts 410 that are socially connected to the user and that have flown on the selected flight(s). In some examples, the social data can include digital content provided by the contacts 410. For example, the social data can include textual posts posted by a contact to a respective social networking service (e.g., a post commenting on the particular flight), and/or other appropriate digital content (e.g., a digital image taken, while on the particular flight).

Referring again to FIG. 3, a task 312 can include booking of the selected flight(s) (obtained in task 310). For example, the enterprise back-end 104 books the flights(s) such that the selected flight(s) are associated with the user (e.g., after financial transactions and confirmation between the user and the enterprise back-end 104). The booking of the flight(s) (e.g., flight reservation) for the user can be stored in a database.

Figure 5:
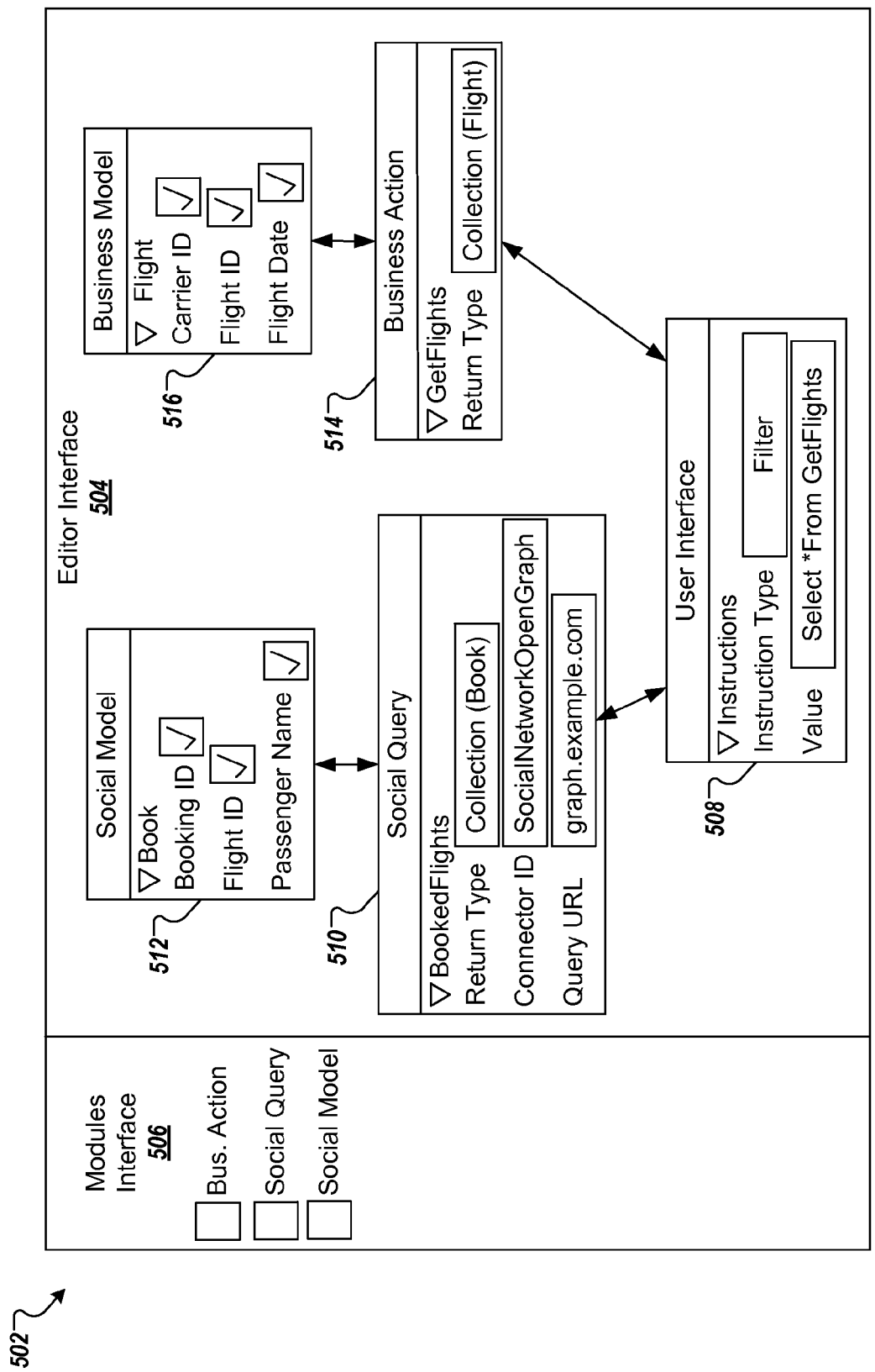
FIG. 5 depicts an example graphical editor tool for composing social queries.

FIG. 5 depicts an example user interface 502 of a graphical editor tool for composing social queries. In some examples, a developer can use the graphical editor tool during a design-time to define triggers for social queries and to define social queries. In the depicted example, the user interface 502 includes an editor interface 504 and a modules interface 506. In some implementations, the editor interface 504 includes one or more input modules for integrating social data with business data during execution of a business processes. In the depicted example, the editor interface 504 includes a user interface module 508, a social query module 510, a social model module 512, a business action module 514, and a business model module 516.

The user interface module 508 represents a particular user interface component of a GUI that can be presented to a user during run-time of an application. For example, the user interface module 508 can be representative of one of a plurality of user interface components that can be displayed to the user in the GUI, and that can receive defined user input. In the depicted example, the user input can include an instruction type of "Filter" and a value associated with a selection from the "GetFlights" data. The user interface module 508 can be connected to the social query module 510 and the business action module 514 (as depicted in the example of FIG. 5). For example, if the user interface module 508 is connected to the business action module 514, a business query is to be triggered in response to receipt of user input through the user interface component that is represented by the user interface module. As another example, if the user interface module 508 is connected to the social query module 514, a social query is to be triggered in response to receipt of user input through the user interface component that is represented by the user interface module.

In some examples, the business action module 514 defines the business action that is to be performed based on input received through the user interface component (e.g., issuing a business query). In the depicted example, the business action module 514 can include the business query based on the "GetFlights" user input such that "Collection (Flight)" data is returned. The business action module 514 is further connected to the business model module 516. The business model module 516 indicates the terms that are to be included in the associated business query, which terms can be populated with values based on the user input received during run-time of the application. In the depicted example, the business model module 516 includes "Flight" including parameters "Carrier ID," "Flight ID," and "Flight Date" that can be populated to provide the business query that is used to query the business data.

The social query module 510 identifies a data source that can be queried based on a social query. In the depicted example, the social query module 510 defines a social query for retrieving booked flight information from socially-connected contacts. For example, data can be obtained through a "Collections (Book)" return type and, for example, from a social data source (e.g., "Social Network Open Graph") that is located at a particular URL (e.g., "graph.exampl.com"). The social query module 510 is further connected to the social model module 512. The social model module 512 indicates the terms that are to be included in the associated social query, which terms can be populated with values based on the user input received during run-time of the application. In the depicted example, the social model module 512 includes "Book" having the parameters "Booking ID," "Flight ID," and "Passenger Name" that can be populated based on the user input and/or received business data to provide the social query that is used to query the social data.

Figure 6:
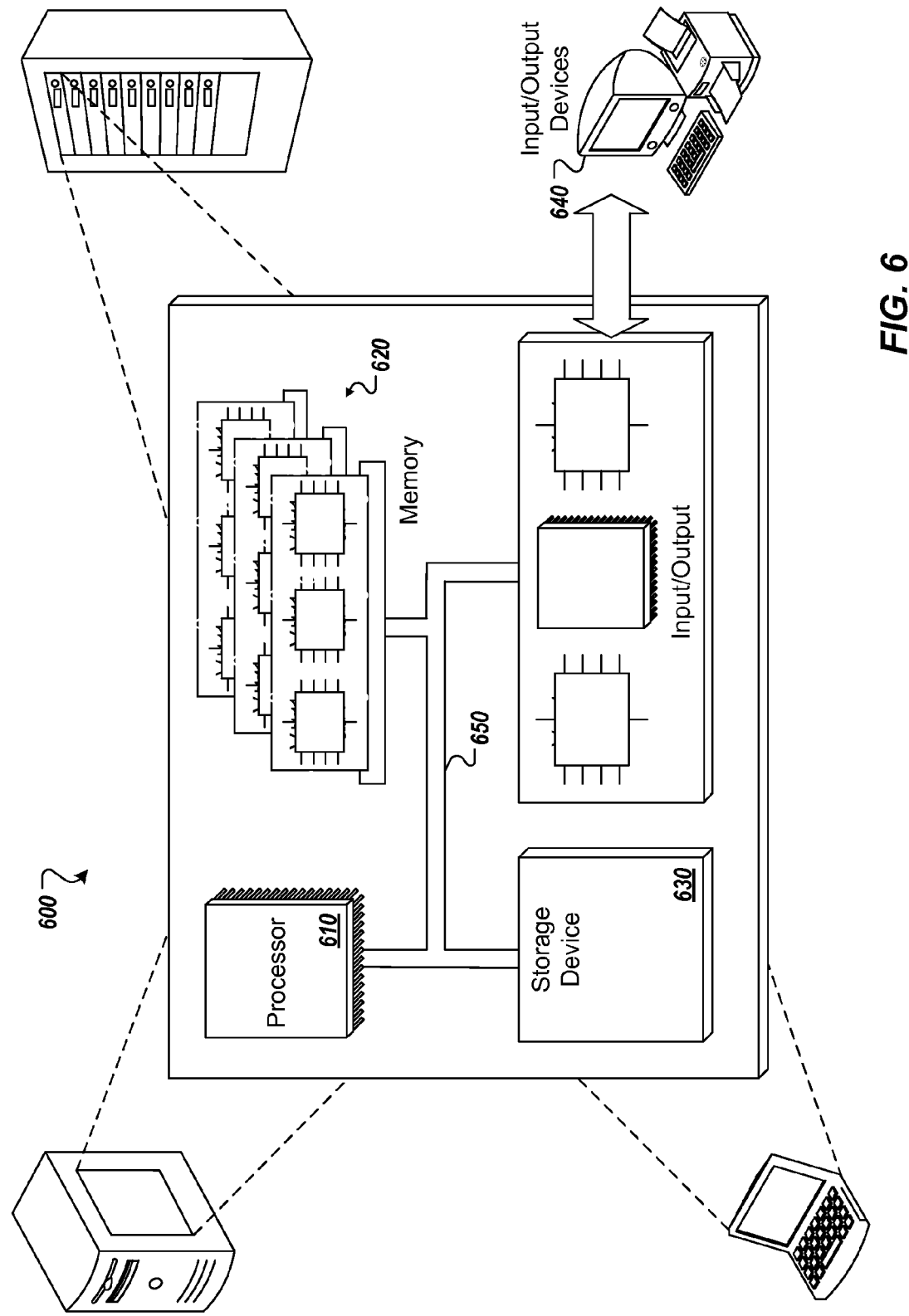
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 660 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. A computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for integrating business data and social data in execution of a business process, the method being executed using one or more processors and comprising:

receiving, by the one or more processors, user input, the user input being associated with a task of the business process and being received during interaction with a user interface component of an application;

generating a business query that comprises terms populated with values based on the user input;

identifying business data based on the business query;

determining, by the one or more processors, that a social query is triggered based on i) the user input and ii) the business query, including determining a trigger status that indicates, for the user interface component, that the social query is triggered in response to the user input being received through the user interface component, and further based on the user interface component being associated with the social query in an association table that associates social queries to user interface components;

generating the social query based on a social query template retrieved from a social query database that is populated with values based on i) the user input received during interaction with the application and ii) the identified business data that is retrieved in response to the user input during interaction with the application;

identifying, by a social connector, social data of one or more social networking services based on a computer-language programming code associated with the social query; and providing at least a portion of the business data and at least a portion of the social data for display to a user that provided the user input.

2. The method of claim 1, further comprising, in response to determining that a social query is triggered:
receiving a social query model, the social query model defining one or more terms of the social query; and
populating at least one term of the one or more terms with a value provided by the social query model.

3. The method of claim 2, wherein the social query model is received from a social query repository.

4. The method of claim 1, further comprising:
receiving a business query model, the business query model defining one or more terms of the business query; and
populating at least one term of the one or more terms with a value provided by the business query model.

5. The method of claim 1, further comprising providing one or more graphical user interface (GUIs) for display to the user, each GUI of the one or more GUIs being associated with a task of the business process and comprising at least one user interface component, through which the user input is received.

6. The method of claim 1, wherein the business query is generated based on a business query model that is defined during a design-time, the business query model defining one or more terms of the business query that can be populated with values based on the user input.

7. The method of claim 1, wherein the social query is generated based on a social query model that is defined during a design-time, the social query model defining one or more terms of the social query that can be populated with values based on the user input.

8. The method of claim 1, wherein the business data is provided from a business data source associated with a back-end system of an enterprise, the enterprise providing the business process.

9. The method of claim 1, wherein the social data is provided from one or more social networking services, each social networking service being independent of an enterprise that provides the business process.

10. The method of claim 9, wherein identifying social networking data based on the social query comprises transmitting the social query to each of the one or more social networking services through respective application programming interfaces (APIs).

11. The method of claim 1, wherein the application comprises a web-based application.

12. A non-transitory computer-readable medium coupled to one or more processors having instructions stored thereon which, when executed by the one or more processors, cause the one or more processors to perform operations for integrating business data and social data in execution of a business process, the operations comprising:
receiving, by the one or more processors, user input, the user input being associated with a task of the business process and being received during interaction with a user interface component of an application;
generating a business query that comprises terms populated with values based on the user input;
identifying business data based on the business query;
determining, by the one or more processors, that a social query is triggered based on i) the user input and ii) the business query, including determining a trigger status that indicates, for the user interface component, that the social query is triggered in response to the user input being received through the user interface component, and further based on the user interface component being associated with the social query in an association table that associates social queries to user interface components;
generating the social query based on a social query template retrieved from a social query database that is populated with values based on i) the user input received during interaction with the application and ii) the identified business data that is retrieved in response to the user input during interaction with the application;
identifying, by a social connector, social data of one or more social networking services based on a computer-language programming code associated with the social query; and
providing at least a portion of the business data and at least a portion of the social data for display to a user that provided the user input.

13. A system, comprising:
one or more processors; and
a non-transitory computer-readable medium coupled to the one or more processors having instructions stored thereon which, when executed by the one or more processors, cause the one or more processors to perform operations for integrating business data and social data in execution of a business process, the operations comprising:
receiving, by the one or more processors, user input, the user input being associated with a task of the business process and being received during interaction with a user interface component of an application;
generating a business query that comprises terms populated with values based on the user input;
identifying business data based on the business query;
determining, by the one or more processors, that a social query is triggered based on i) the user input and ii) the business query, including determining a trigger status that indicates, for the user interface component, that the social query is triggered in response to the user input being received through the user interface component, and further based on the user interface component being associated with the social query in an association table that associates social queries to user interface components;
generating the social query based on a social query template retrieved from a social query database that is populated with values based on i) the user input received during interaction with the application and ii) the identified business data that is retrieved in response to the user input during interaction with the application;
identifying, by a social connector, social data of one or more social networking services based on a computer-language programming code associated with the social query; and
providing at least a portion of the business data and at least a portion of the social data for display to a user that provided the user input.

* * * * *